United States Patent [19]

Michels et al.

[11] 4,157,315

[45] Jun. 5, 1979

[54] METHOD OF PREPARING A SUPPORTED CATALYST AND THE CATALYST PREPARED BY THE METHOD

[75] Inventors: Harold T. Michels, Congers; Raymond P. Jackson, Suffern, both of N.Y.

[73] Assignee: The International Nickel Company, Inc., New York, N.Y.

[21] Appl. No.: 427,243

[22] Filed: Dec. 21, 1973

[51] Int. Cl.$^2$ .................. B01J 21/08; B01J 23/26; B01J 23/72; B01J 23/74
[52] U.S. Cl. .................. 252/458; 252/454; 252/459; 252/477 R; 423/213.5; 423/239; 427/344; 427/372 B
[58] Field of Search .......... 252/454, 458, 459, 477 R; 423/213.2; 106/286, 287 S, 287 SE, 290; 427/344, 372 B

[56] References Cited

U.S. PATENT DOCUMENTS

| | | | |
|---|---|---|---|
| 3,518,206 | 6/1970 | Sowards et al. | 252/459 X |
| 3,674,526 | 7/1972 | Self | 106/286 |

Primary Examiner—W. J. Shine
Attorney, Agent, or Firm—Miriam W. Leff; Ewan C. MacQueen

[57] ABSTRACT

A method is provided for preparing a supported catalyst composed of a structural substrate having an adherent, coherent, coating of a catalytic material which comprises applying on the substrate a dispersion comprising a stabilized colloidal silica solution having dispersed therein a fine metal powder which contains at least two of the metals nickel, chromium, and copper as mixtures or alloys or a combination thereof, and firing the coated substrate in a protective atmosphere at an elevated sintering temperature to form an adherent, coherent, coating.

24 Claims, No Drawings

METHOD OF PREPARING A SUPPORTED CATALYST AND THE CATALYST PREPARED BY THE METHOD

BACKGROUND OF THE INVENTION

This invention relates to a supported catalyst which is useful for high temperature reactions, and more particularly to a method of preparing a catalyst composed of a structural support provided with a catalytically active coating. In one specific embodiment the present invention is directed to the preparation of a supported catalyst having a composition and structural configuration that makes it especially suited for the removal of nitrogen oxides from waste streams, such as exhaust gases from certain industrial processes or from internal combustion engines.

Automobile exhaust contributes significantly to air pollution, the principal gaseous polluting constituents, being CO, unburned or partially burned hydrocarbons, and nitrogen oxides. Many methods are being used in the attempt to combat this problem, including catalytic conversion of the harmful constituents to innocuous products before emission of the exhaust to the air. At present, however, it is considered particularly difficult to reduce the nitrogen oxides to suitably low levels.

Numerous catalysts have been prepared for this purpose. Among the most promising are those catalysts containing chromium, copper and nickel or their oxides and combinations and alloys thereof. U.S. Pat. No. 3,565,574, for example, concerns the use of various nickel, copper and chromium containing alloys such as stainless steel, "Inconel" and "Monel" alloys for the purification of exhaust gases, and reports the use of a "Monel" alloy in the form of chips, as a catalyst for nitrogen oxide reduction. ("Inconel" and "Monel" are trademarks of Inco Companies.) U.S. Pat. No. 3,669,906 discloses pellets and extrudates prepared from a calcined mixture composed of eta- and gamma-$Al_2O_3$ and heavy metal oxides of chromium and nickel or chromium, nickel, and copper. Copending application Ser. No. 411,692, filed Nov. 12, 1973, now U.S. Pat. No. 3,928,235, discloses catalysts useful for the reduction of nitrogen oxides, which are prepared from various alloys of chromium, nickel and copper made by a powder metallurgy technique. In addition to the Cr, Ni, and Cu components, the catalysts may include other metals, or compounds thereof, e.g., selected from Groups IB and IV to VIII of the Periodic System, such as Ti, V, Mn, Fe, Co, Ag, Pt, Pd, Ru, Mo, etc. Oxides, e.g., of Al, Ba, Zr, and Co, may also be present.

It is well known that in addition to composition there are many factors which contribute to catalytic performance. Structural design, for example, plays a marked role in determining catalyst suitability for a particular process. The interrelationships of the catalyst composition, design and process conditions are highly complex and often difficult to isolate from each other. In many processes using fixed bed catalysts, where large volumes of gases or liquid are passed through the reactor, it is advantageous to have a high surface area of the catalyst exposed so as to facilitate contact of the reactants at the surface. To be economically useful, the catalyst surface area should be large relative to the total amount of catalyst. The availability of the catalyst surface is particularly important in certain gaseous reactions, such as the purification of automobile engine exhaust streams and nitric acid plant tail gas streams, where the gas may pass through or adjacent to the catalyst at a very high linear velocity. In such processes, conventional particulate catalysts, e.g., pellets, chips, cylinders, spheres, and the like, have the disadvantage that they contribute to back-pressure build-up in the system. Also, the particulate catalysts are more subject to attrition than a catalyst in which the movement is more restricted. In such types of reactions a structural form which will permit free passage of the reacting gases relative to the surface exposed will greatly enhance the suitability of an active catalytic material. Typical of the high surface area - larger open area stationary catalyst structures are metal gauze, woven metal screens, expanded metal mesh, honeycomb, metal foam, and knitted metal mesh. Configurations of this type are referred to herein as open mesh structures. They may be massive catalyst structures or the catalyst may be deposited on a support of suitable design. The supports which may be made, for example, of metal or ceramic, may participate in the catalytic activity or may serve merely to present the catalyst in a suitable structural pattern. However, certain catalyst compositions which have been found active for purifying waste streams cannot be fabricated readily into desired shapes, and further, it has been difficult to form satisfactory and adherent coatings on suitable high temperature supports.

Thus it is the object of this invention to provide a method of preparing a high temperature catalyst comprised of various combinations of the metals nickel, copper, and chromium in the form of an open mesh configuration.

Another object is to provide a method for preparing a high temperature catalyst comprised of a structural support and an adherent coating of catalytic material on the support.

A further object is to provide an improved catalytic process for the removal of nitrogen oxides from waste streams.

Still another object is to provide an improved process for the purification of automobile exhaust, whereby nitrogen oxides and CO in such streams are, respectively, catalytically reduced to $N_2$ and oxidized to $CO_2$.

These and other objects are achieved in accordance with the present invention, as will be illustrated by the description and examples given herein.

THE INVENTION

The present invention provides a method of producing a supported catalyst comprising a structural substrate having an adherent, coherent, coating of a catalytic material thereon, comprising:
  (a) applying on the substrate a dispersion comprising a stabilized colloidal silica solution having dispersed therein a fine metal powder, said metal powder consisting essentially of at least two metals selected from nickel, chromium and copper, and
  (b) firing the coated substrate in a protective atmosphere at an elevated temperature to provide a thin adherent, coherent, coating containing silica and an effective amount of catalytically active material.

The term catalyst, as used herein, includes materials which are precursors of active catalysts and form the active catalysts upon a preliminary activation treatment and/or under operating conditions.

Stabilized colloidal silica is a well-known type of vehicle in the coating art and many commercial preparations are available. The silica-based vehicles may be either organic or inorganic. One effective type of silica solution is an aqueous alkali-stabilized colloidal silica. The products sold under the names "Polysilicate 48" and "Ludox" by E. I. Du Pont de Nemours are examples of suitable materials. "Polysilicate 48," for example, is a lithium-stabilized colloidal silica solution containing about 20% silica.

The metals which are present in the fine metal powder may be present as a mixture of elemental metals, an alloy of at least two of the metals copper, nickel and chromium, or a mixture containing the metals in elemental form and one or more alloys.

With respect to automobile exhaust purification, it was found that the silica, which appears to be inert to the reactants and stable at high temperature and changing environment, did not interfere with the activity of the catalytically active component of the coating. Sufficient silica must be present to form an adherent and coherent continuous coating. For example, of the total metal powder and silica content, the minimum $SiO_2$ content for an adherent and coherent coating is about 1%, by weight. The $SiO_2$ content can be considerably higher, however, the metal powder must be present in an amount to provide an effective catalytically active surface. Preferably the silica in the coating will be present in relatively low concentration relative to the metal components. Thus to form an effective catalytic coating the dispersion used to provide the coating will preferably contain a major amount of metal powder relative to the silica. Advantageously, the mole ratio of metal powder to silica in the dispersion (based on an average molar weight of the metal component equal to 60) is about 5 to about 150 metal to about 1 silica.

It will be noted that in many known supported catalysts a refractory oxide such as $SiO_2$ serves as a bulk support material, the heavy metal component being deposited from solution containing a compound of the metal on macroparticles of $SiO_2$ by, e.g., impregnation and precipitation techniques. Contrastingly, in the present method the heavy metals are neither deposited from a compound nor does the $SiO_2$ serve as a support. Instead, the heavy metals are dispersed in the precursor formulation as elemental metals and/or alloys, the metal powders and colloidal silica are co-deposited on a support, and a coating is developed from such co-deposit. Conventional methods for developing catalytic coatings which rely for thin source of metals directly on a deposit from a solution of compounds of metals are often limited with respect to the amount of metals that can be deposited in a single application and/or in the form in which the metals are deposited. For example, with respect to the amount or concentration of the metals, the solubility of the compounds is a limiting factor which may contribute among other things to the cost of preparing the catalyst. By using the heavy metals as elemental or alloy powders the concentrations of metals in the deposit are not limited by their solubility. Further, whereas it may be difficult to deposit an elemental metal or alloy from solution, using the elemental and/or alloy form initially, avoids this problem.

The metal components of the dispersion are present as fine powders, which as noted may be in elemental form, in the form of alloys, or a combination thereof. The metal component may be, for example, a mixture of fine powders of nickel and copper, nickel and chromium, copper and chromium, or nickel, copper and chromium. The fine powders may be alloys of such metals or a mixture of elemental metals and alloys.

Where copper is present as an elemental powder it tends to react with the colloidal silica and for this reason, it is preferable not to use the copper in elemental form. Thus if the copper is, for example, prealloyed with nickel or with chromium and nickel, the dispersion can be handled more easily. If the copper is present in elemental form, the dispersion should be used as soon as it is prepared. The elemental metals or alloys which are incorporated as powders in the formulation must be of fine particle size in order to form a continuous, adherent coating. Preferably the metal powder has a particle size such that at least about 30 wt. % will be less than about 7 microns. More preferably the particle size of the metal powders will be predominantly of the order of about 2 to 3 microns average, as measured by the Fisher Sub-sieve Analyzer.

While the essential metallic component of the dispersion consists essentially of the aforementioned combinations of nickel, chromium and copper, it will be understood that many additives may be incorporated in the metal component of the dispersion to develop a suitable catalytic coating. The additives will, of course, depend in a large measure on the particular process for which the catalyst is used. As indicated above, it is well known for the purification of waste streams to include other metals or compounds with the various nickel, chromium and copper combinations. For example, the additives may be selected from metals of Groups IB and IV to VIII of the Periodic System, such as Ti, V, Mn, Mo, Fe, Co, Ag, Pt, Pd, and Ru. Rare earth metals, and compounds such as oxides of Al, Ba, Zr and Co are further examples of well-known additives. The additives may be included in powder form or alloyed with the basic components.

Suitable formulations of the present invention have the following compositions:

| Component | Wt. % |
| --- | --- |
| Stabilized Colloidal Silica | 1–14 |
| Fine Metal Powder | 99–86 | wherein the fine metal powder consists essentially of at least two metals selected from nickel, copper and chromium.

The metal powder component may, for example, consist essentially of about 10% to about 80% nickel, about 20% to about 60% copper, and up to about 35% chromium.

With respect to the metal powder component of the formulation, where it consists essentially of chromium and copper, it may contain, for example, about 15% to about 50% chromium and the balance essentially copper; where it consists essentially of chromium, nickel, and copper, it may contain, for example, about 10% to about 70% nickel, about 20% to about 60% copper and about 5% to about 35% chromium; where it consists essentially of nickel and copper, it may contain, for example, about 10% to about 80% nickel and the balance essentially copper.

Aqueous formulations of the above formulations advantageously contain about 30 to 70% solids.

In a preferred embodiment the metal powders are mixed with a suspension agent. The purpose of this is to keep the metal powders suspended in the colloidal silica solution. In general suitable suspension agents are high molecular weight water-soluble resins, examples of which are "Carbopol" (a product of B. F. Goodrich Chemical Co.), "Ben-A-Gel" (a product of National Lead Co.), and "AMP-95" (a product of Commercial Solvents Corp.). About 1 part of the suspension agent to about 50 to 250 parts of metal powder is found to be satisfactory.

The function of the substrate, also referred to herein as the support, is to serve as a framework for the catalytic component and to lend physical support to the material. The substrate may be in any desirable configuration, depending mainly on the process and the apparatus in which it is used. When in the form of an open mesh type structure, the support provides a high surface area of catalytically active material, and it permits high velocity gas flows through the catalyst bed without excessive back-pressure build-up in the system. The substrate may be made of metal or ceramic. However, the present method is especially useful where metal structures are desired since adherent, coherent, catalytic coatings on metal substrates can be prepared. The material of construction of the support is selected in part on the basis of the environment in which the catalyst is to be used. Where the principal function of the substrate is to provide a suitable structural configuration, there is a further requirement that the substrate be appropriately readily fabricated into the desired shape. Substrates suitable for use as a structural support for catalysts used to purify automobile exhaust must have a sufficiently high melting point and must be able to withstand severe cyclic oxidizing and reducing conditions. Preferably the substrates can be wetted to some degree by the metal-containing silica deposit. Examples of metals which can be used as substrates are high temperature iron-base and nickel-base alloys, e.g., an austenitic stainless steel or a high nickel-containing "Nichrome". The substrate may be made of ceramic, e.g., alumina, aluminosilicates, zircon mullite, magnesium silicates, cordierite, spodumene, forsterite, steatite, vermiculite, etc. To increase wettability of the ceramic, a flash coating of metal, e.g., nickel may be used.

The aqueous dispersion containing the $SiO_2$ and metal powders may be applied by any convenient method, e.g., spraying, brushing, dipping, rolling, and the like. A preferred dispersion contains about 40 to 70% solids, i.e. silica and metal powder and at least 50% of the particles are less than 7 microns. Such dispersions, when applied and fired on a substrate, form a coating of about 0.003 inch in thickness. To build a thicker layer additional coatings are applied. Each coating may be fired separately. Advantageously successive coats of the dispersion are applied, with drying in between, and the multicoated substrate is fired to form a catalytic coating on the support of about 0.01 inch thickness.

To develop a suitable coating, firing is effected in a protective atmosphere, i.e., a non-oxidizing or reducing atmosphere, e.g., $H_2$, $N_2$—$H_2$, $NH_3$, an inert gas such as $N_2$ or Ar, or a high vacuum. The firing temperature is below the melting point of the lowest melting component. The temperature and time factors are interrelated, longer periods of time being required for lower temperatures. The object is to achieve sintering of the particles. In general it is desirable to use a lower temperature, but one in which sintering can be effected in a reasonable period of time. Suitable catalytic coatings of the present invention are developed at a temperature in the range of about 1400° F. to about 1900° F.

The following illustrative examples are given for the purpose of providing those skilled in the art with a better understanding of the invention.

EXAMPLE 1

"Nichrome" expanded metal screens and 309 stainless steel pellets were grit blasted with sand and coated with a dispersion containing a mixture of elemental powders of Ni and Cu in the weight proportion of 70 Ni: 30 Cu. The dispersion was prepared as follows: "Carbopol" 941 (a high mol. wt. carboxy-vinyl polymer, a product of B. F. Goodrich Chemical Company) in the amount of 0.04 grams is added to 36 grams of a mixture of Ni (minus 325 mesh) and Cu (minus 325 mesh) powders in the weight ratio of 70:30. The resulting mixture is blended with 21 ml. of a solution of "Polysilicate 48" with water to 1:1, i.e., one part of solution to one part of water, by volume.

The coated substrates were fired in an ammonia atmosphere at a temperature of about 1900° F. for a period of one half hour to form coherent and adherent coatings on the metal supports.

EXAMPLE 2

Using a procedure similar to that described in Example 1, "Nichrome" expanded metal screens and 309 stainless steel pellets were coated with aqueous polysilicate solutions containing, respectively, various Ni-Cu-Cr compositions listed in TABLE I. The metal powder used in each of the Ni-Cu-Cr variations was a mixture of elemental powders. The weight ratio of metal powder to silica in the formulations was about 15 parts of metal powder to 1 silica and the aqueous dispersion contained about 63% solids.

TABLE I

| POWDER COMPOSITION | 1 | 2 | 3 | 4 | 5 | 6 | 7 | 8 | 9 |
|---|---|---|---|---|---|---|---|---|---|
| WT. % Ni | 13 | 15 | 26 | 30 | 34 | 45 | 50 | 65 | 70 |
| WT. % Cu | 52 | 60 | 39 | 45 | 51 | 30 | 35 | 20 | 30 |
| WT. % Cr | 35 | 25 | 35 | 25 | 15 | 25 | 15 | 15 | — |

As in the 70Ni-30Cu sample of Example 1, the samples having the Ni-Cu-Cr containing coatings were fired in an ammonia atmosphere at about 1900° F. for one half hour, to develop coherent, adherent, coatings on the respective substrates.

EXAMPLE 3

Samples of "Nichrome" sheet 1.25×0.75×0.068 inch sheets and 1.25×0.075×0.005 expanded metal mesh coated as described in Example 2 with the metal components 1 to 8 listed in TABLE I, were subjected to a cyclic test in synthetic automobile exhaust which consisted of alternate 16 hour oxidation and reduction cycles at 1700° F. with intermediate cooling to room temperature. The synthetic gas mixture was composed of 0.15% NO, 0.01% hydrocarbon ($C_3H_8$), 14% $CO_2$, 0.5% $H_2$, 10% $H_2O$, 1.5 to 3.0% CO, 0.5–4% $O_2$ and the balance $N_2$. The $O_2$ content in the oxidation cycle is 4% and in the reduction cycle is 0.5%, representing realistic oxygen levels which the catalyst will be subjected to in operation. The CO content is varied to determine the effect of CO-level on stability.

At the end of the first oxidation cycle, all specimens in the form of sheets were dropped from a height of four feet and no spallation of the oxide, which developed on the surface of the samples, was observed. The tight adherent scale which developed during the first oxidation cycle did not exhibit significant changes in weight or appearance during 80 hours of testing, as shown in the results tabulated in TABLE II.

EXAMPLE 4

Coated pellets composed of a substrate of 0.125 inch dia. × 0.165 length 309 stainless steel pellets and a Ni-Cu-SiO$_2$ coating containing 70% Ni - 30% Cu were prepared in accordance with this invention, using the procedure described in Example 1. The coated samples were maintained at 1500° F. in air for a period of 2 hours. A tight adherent oxide scale was observed on the samples. Samples of this material were evaluated in a simulated first-stage reactor of a dual-bed catalytic converter.

In the tests, 15 cc of the pellets were placed in a fixed-bed downflow 0.8 inch diameter quartz reactor. The catalyst bed was approx. 1.8 inches deep. Gaseous feeds, simulating automobile exhaust were prepared by mixing metered flows of the specific constituents. The inlet gas had a composition, by volume, of 0.15% NO, 1.50% CO, 0.05% C$_3$H$_8$, 10% CO$_2$, 0-1.0% O$_2$ and the balance N$_2$. The gas feed was saturated to 10% H$_2$O. The O$_2$ level was varied from 0 to 1.0% at 1300° F., then at 1500° F., and then again at 1300° F. so that the effect of variation of the O$_2$ level and temperature on the reactivity of the catalyst could be determined. (About 1.0% O$_2$ represents the stoichiometric amount required to oxidize all the CO and hydrocarbons in the stream.)

TABLE II

WEIGHT IN GRAMS AFTER EXPOSURE TO SYNTHETIC EXHAUST GAS* AT 1700° F.**

| Cycle | Time | Total Time | Sample No. 1 | 2 | 3 | 4 | 5 | 6 | 7 | 8 |
|---|---|---|---|---|---|---|---|---|---|---|
| Start | 0 | 0 | 8.6268 | 8.9085 | 8.9613 | 8.8647 | 8.7029 | 8.5316 | 8.5709 | 8.8724 |
| Oxidation | 16 | 16 | 8.6540 | 8.9347 | 8.9739 | 8.8989 | 8.7435 | 8.5527 | 8.6013 | 8.8965 |
| Reduction | 16 | 32 | 8.6394 | 8.9170 | 8.9633 | 8.8827 | 8.7233 | 8.5394 | 8.5911 | 8.8910 |
| Oxidation | 16 | 48 | 8.6431 | 8.9325 | 8.9701 | 8.8957 | 8.7430 | 8.5511 | 8.6040 | 8.8972 |
| Reduction | 16 | 64 | 8.6420 | 8.9208 | 8.9623 | 8.8842 | 8.7450 | 8.5400 | 8.5919 | 8.8902 |
| Oxidation | 16 | 80 | 8.6413 | 8.9323 | 8.9694 | 8.8960 | 8.7451 | 8.5513 | 8.6035 | 8.8970 |

*.15% NO, 0.01% HC, 0.5% H$_2$, 10% H$_2$O, 1.5 to 3.0% CO, 0.5-4% O$_2$, Bal. N$_2$
**Nominal area of 0.127 sq. in.

Analysis for NO, NO$_2$ and/or NH$_3$ was made with a Chemiluminescent Analyzer, with NH$_3$ analysis supplemented by periodic checks by a wet chemical technique.

Comparative runs were made using as the catalyst pellets prepared in a conventional manner, viz. from a vacuum melt of a 70%Ni-30%Cu alloy drawn to rod. The pellets were heat treated at 1800° F. in air for 3 hours.

Typical results showing the comparative performance at 1300° F. and 1500° F. and at various O$_2$ levels are shown in TABLE III. In TABLE III the catalyst prepared as a coated pellet in accordance with this invention is referred to as Catalyst A; the conventional type 70Ni-30Cu pelleted catalyst is referred to as Catalyst M.

TABLE III

CATALYST ACTIVITY

Temperature = 1300° F.
Space Velocity = 40,000 V/V/hr.

| % O$_2$ | % Conversion NO→N$_2$ at 0.5 | 0.75 | % Formed NH$_3$ at | % Conversion CO→CO$_2$ at 0.5 | 1.0 |
|---|---|---|---|---|---|
| Catalyst A | 93 | 50 | 10 | 80 | 92 |
| Catalyst M | 93 | 25 | 9 | 81 | 96 |

TABLE III-continued

CATALYST ACTIVITY

Temperature = 1300° F.
Space Velocity = 40,000 V/V/hr.

| % O$_2$ | % Conversion NO→N$_2$ at 0.5 | 0.75 | % Formed NH$_3$ at | % Conversion CO→CO$_2$ at 0.5 | 1.0 |
|---|---|---|---|---|---|

Temperature = 1500° F.
Space Velocity = 40,000 V/V/hr.

| | | | | | |
|---|---|---|---|---|---|
| Catalyst A | 99 | 98 | 2 | 78 | 95 |
| Catalyst M | 99 | 98 | 1 | 76 | 96 |

The results show that the catalytic performance of Catalyst A prepared in accordance with the present invention was comparable to that of a conventional type catalyst prepared in bulk from a commercial Monel alloy. This illustrates that the SiO$_2$ in the coating did not have a harmful effect on the catalytic activity. However, Ni-Cu content of the catalyst of this invention was about 90% less than that of the conventional type pellet. In addition, using the preparation of this invention, the catalyst can be prepared in any desirable configuration, e.g., as an open mesh type catalyst which would increase the performance of the catalyst materially. Further, it will be noted that the preparation of desirable configurations is not limited by the fabricability of the metal. Even Cr-Ni-Cu composition with high chromium levels can be made in complex shapes.

The preparation of the catalysts of this invention was discussed above mainly with references to developing catalysts for the removal of nitrogen oxides from waste streams, e.g., for automobile emission control. However, catalysts of the type described may also be used for other environmental and industrial applications, especially for high temperature use.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A method of preparing a supported catalyst comprising a structural substrate having an adherent, coating of a catalytic material thereon, comprising:
   (a) applying on the substrate a dispersion comprising a stabilized colloidal silica solution having dispersed therein a fine metal powder, said metal powder consisting essentially of at least two metals selected from nickel, chromium and copper, and said metal powder consisting essentially of at least one of the group: a mixture of at least two of said metals in elemental form, an alloy of at least two of said metals, a mixture containing at least one of said metals in elemental form with one or more of said alloys, and (b) firing the coated substrate in a protective atmosphere at an elevated temperature in the range of from about 1400° F. to below the melting point of the lowest melting component for a period of time sufficient to sinter the metal powder and to provide a thin, adherent, coherent, coating containing silica and an effective amount of catalytically active material.

2. A method of claim 1, wherein the metal powder and silica in the dispersion are present in concentrations, by weight of about 99% to about 86% metal powder and 1% to about 14% silica.

3. A method of claim 1, wherein the weight ratio of metal powder to silica is about 15 parts of metal powder to 1 of silica.

4. A method of claim 1, wherein the metal powder of the dispersion consists essentially of about 15 to about 50% chromium and the balance essentially copper.

5. A method of claim 1, wherein the metal powder of the dispersion consists essentially of about 10% to about 80% nickel, about 20% to about 60% copper, and up to about 35% chromium.

6. A method of claim 5, wherein the metal powder of the dispersion consists essentially of about 10 to 80% Ni and the balance essentially copper.

7. A method of claim 1, wherein the metal powder is present in a particle size such that at least about 30% is less than about 7 microns.

8. A method of claim 1, wherein firing is carried out at a temperature of about 1400° F. to about 1900° F.

9. A method of claim 8, wherein the firing is carried out in an $NH_3$-containing atmosphere.

10. A method of claim 1, wherein the dispersion is aqueous.

11. A method of claim 1, wherein a suspension agent for the metal powder is present in the dispersion.

12. A method of claim 1, wherein the substrate is a metal having an open mesh configuration.

13. A method of claim 12, wherein the metal is stainless steel.

14. A formulation especially useful for preparing a catalytically active coating consisting essentially of a stabilized colloidal silica solution having dispersed therein a metal powder of fine particle size selected from at least one of (1) a mixture consisting essentially of elemental powders of nickel and copper, (2) a mixture consisting essentially of elemental powders of chromium and nickel, (3) a mixture consisting essentially of chromium and copper, (4) a mixture consisting essentially of elemental powders of chromium, nickel and copper, (5) an alloy consisting essentially of nickel and copper, (6) an alloy consisting essentially of nickel and chromium, (7) an alloy consisting essentially of chromium and copper, and (8) an alloy consisting essentially of chromium, nickel and copper.

15. A formulation of claim 14, wherein the dispersion contains silica and metal powder in concentrations, by weight, of about 1% to about 14% silica and about 99% to about 86% metal powder.

16. A formulation of claim 14, wherein the metal powder is present in a particle size such that at least about 30% is less than about 7 microns.

17. A formulation of claim 14, wherein the metal powder of the dispersion consists essentially of about 15% to about 50% chromium and the balance essentially copper.

18. A formulation of claim 14 wherein the metal powder of the dispersion consists essentially of about 10% to about 80% nickel, about 20 to about 60% copper, and up to about 35% chromium.

19. A formulation of claim 14, wherein a suspension agent for the metal powder is present in the dispersion.

20. A formulation of claim 14, wherein the dispersion is aqueous.

21. A method of claim 1, wherein the coated substrate is fired in an atmosphere selected from $H_2$, $N_2$—$H_2$, $NH_3$, an inert gas, and a vacuum.

22. A method of claim 1, wherein the protective atmosphere is non-oxidizing or reducing.

23. A catalyst for purifying exhaust gases produced by a process, said catalyst being supported on a substrate, which comprises the steps of:
   mixing particles of nickel and copper or nickel, copper and chromium with a stabilized colloidal silica solution; applying said mixture to a substrate;
   sintering said particles in a non-oxidizing atmosphere;
   oxidizing said sintered particles in air or an oxygen-containing gas; and
   activating said sintered mixture at a temperature ranging from 704° to 815° C. under an atmosphere of a reductive gas or a non-oxidizing gas.

24. A method for preparing a catalyst for purifying exhaust gases from internal combustion engines and the like, said catalyst being supported on a substrate, which comprises the steps of:
   mixing particles of nickel and copper or nickel, copper and chromium with a stabilized silica solution;
   applying said mixture on a substrate;
   sintering said particulate mixture at a temperature ranging from 760° C. in a non-oxidizing atmosphere;
   oxidizing said sintered particles in air or an oxygen-containing gas;
   activating said sintered mixture at a temperature ranging from about 704° to 815° C. under an atmosphere of a reductive gas or a non-oxidizing gas.

* * * * *